United States Patent
Kauffman et al.

[11] Patent Number: 5,082,708
[45] Date of Patent: Jan. 21, 1992

[54] TENSION FLOOR COVERING WITH REINFORCING LAYER

[75] Inventors: William J. Kauffman; George L. Lilley, both of Manheim; David E. Ruch, Lancaster, all of Pa.

[73] Assignee: Armstrong World Industries, Inc., Lancaster, Pa.

[21] Appl. No.: 304,583

[22] Filed: Feb. 1, 1989

[51] Int. Cl.$^5$ .......................... B32B 3/14; B32B 3/10; D06N 1/00; E04F 15/16

[52] U.S. Cl. ...................................... 428/47; 428/44; 428/136; 428/138; 428/155; 428/218; 428/251; 428/252; 156/163; 156/84; 156/229; 264/210.8; 264/209.5; 52/384

[58] Field of Search ................ 428/44, 136, 138, 155, 428/218, 251, 252, 47; 156/163, 84, 224; 264/210.8, 209.5; 52/384

[56] References Cited

U.S. PATENT DOCUMENTS

| | | | |
|---|---|---|---|
| 2,556,071 | 6/1951 | Denton | 427/138 Y |
| 2,800,423 | 7/1957 | De Swart | 154/43 |
| 3,297,461 | 1/1967 | Siddall | 117/4 |
| 3,464,178 | 9/1969 | Deichert et al. | 52/309 |
| 3,990,929 | 11/1976 | Evans | 156/71 |
| 4,135,675 | 1/1979 | Greiner, Jr. et al. | 242/67.1 R |
| 4,159,219 | 6/1979 | Evans | 156/71 |
| 4,618,530 | 10/1986 | Stetson | 428/236 |
| 4,654,244 | 3/1987 | Eckert et al. | 428/47 |
| 4,769,260 | 9/1988 | Long | 427/176 |

OTHER PUBLICATIONS

Congoleum Corporation Flyer (M1178) entitled, "Congoleum ® Accent Supreme ® Vinyl Flooring Featuring Exclusive Superflex ® Construction Installation Procedure".

Congoleum Corporation Pamphlet (M1177), entitled "How to Install Accent Supreme Vinyl Flooring".

*Primary Examiner*—Patrick J. Ryan
*Assistant Examiner*—William P. Watkins, III

[57] ABSTRACT

A vinyl tension floor covering includes a reinforcing layer, preferably disposed below the neutral bending plane. The floor covering elongates in at least one direction due to a controlled pre-stressed condition and tends to return to its original pre-elongated dimension. Reinforcing layers expand in the across machine direction as well as machine direction in response to a tensile stretching force in the machine direction or roll-up growth.

45 Claims, 6 Drawing Sheets

TENSION FLOOR COVERING WITH REINFORCING LAYER

FIELD OF THE INVENTION

The invention relates to vinyl surface coverings. In particular, the invention is directed to tension floor coverings having a reinforcing layer.

BACKGROUND OF THE INVENTION

A considerable body of knowledge has developed on vinyl flooring materials and reinforcement materials for such flooring. Reinforcing layers, and more commonly, glass reinforcing layers, have received increasing attention in recent years for the construction of surface coverings. Floor coverings, in particular, have employed glass reinforcing layers, although the majority of the products which have contained such reinforcing layers have been developed in Europe. The reason for this appears to be that European dwellings are constructed primarily on concrete slabs which are dimensionally stable. These reinforced floor coverings have been loose-lay floor coverings which have been adequate for the substantially dimensionally stable European subfloors.

In the U.S., however, substantially different methods of construction are used whereby most structures contain suspended wooden subfloors, including particleboard and plywood. Although structures of this type are less expensive than those containing concrete flooring, suspended wooden subfloor is less stable than concrete when subjected to humid summer/dry winter seasonal changes. Self-induced tension floorings have been developed for these less stable subfloors. However, no tension flooring has had a reinforcing layer. This is because reinforcing layers of the prior art were used to obtain dimensional stability and therefore, did not permit elongation of the surface covering.

Swart U.S. Pat. No. 2,800,428 entitled "Molded Article of Stretchable Glass Cloth" provided a concept of patterned cuts in a plastic sheet or glass cloth so that the sheet or cloth can be stretched and adapted for fitting compound curves without any need for cutting special patterns. There is no suggestion in Swart of placing the cloth in a pre-stressed condition or any advantage to use such a glass cloth over a substantially planar surface as the subfloors of the present invention.

Siddall U.S. Pat. No. 8,297,461 entitled "Reinforced Plastic Sheeting" disclosed how segmented inextensible filaments such as glass fibers encapsulated in polyvinyl chloride (PVO) can produce sheets capable of being stretched or compressed a small amount in any direction and any one portion of the sheet can be stretched or compressed without affecting any other portion so that the sheet could be used as flashing on a roof. Siddall teaches use of annealed metal filaments so that when deformed they have no memory and therefor no tendency to return to their original shape.

Deichert et al. U.S. Pat. No. 3,464,178 teaches a method of installing resilient sheet flooring having a porous backing and a thermoplastic resin layer which shrinks in both the machine direction and across machine direction by bonding the backing layer of the sheet flooring to the perimeter of the room and to each other.

Evans U.S. Pat. No. 3,990,929, which is incorporated by reference, teaches methods of manufacturing and installing self-induced tension flooring or surface covering by manufacturing the structure on a thermally dimensionally stable backing. The backing not only serves as a carrier on which the flooring is manufactured but the backing also remains with the surface covering and is removed just prior to installation at the job site. The surface covering is secured at its perimeter only before the stresses therein are relieved.

Evans U.S. Pat. No. 4,159,219 teaches a method to produce an unbacked tension flooring by the specific design of two or more thermoplastic layers constructed such that when rolled, the outward facing layer elongates and the inward facing layer is compressed. Upon unrolling and placing flat, the elongated layer overcomes the compressed layer and thus a length greater than the original length before roll-up is generated. This elongation is defined herein as "roll-up growth". On securing the surface covering only at its periphery shortly after unrolling, the tendency of the surface covering to return to its original dimension, i.e. its elastic memory, creates a self-induced tension therein.

Greiner, Jr. et al. U.S. Pat. No. 4,135,675 shows a paper carrier stripping method and stripping apparatus which prevents uncontrolled tension from the necessary procedure of removing a strippable carrier from the structure before placing into a roll upon a windup stand.

Installation of these elongated tension floors by attachment at their periphery has produced one of the most reliable installation methods to accommodate fluctuating dimensional changes of unstable wood subfloors in today's environment. However, such tension floors are deficient in that the tension required to elongate the surface covering sufficiently to accommodate change of wooden subfloors may be excessive. Further, the elongation of the surface covering is typically only in one direction.

Eckert et al. U.S. Pat. No. 4,654,244 entitled "Loose-Lay and Adhered Surface Coverings" teaches the in-situ modification of reinforcing layers to form a surface covering capable of accommodating the movement of very unstable subfloors such as particle board. One requirement of loose-lay flooring is that it must lay flat upon the subfloor and not curl or dome after installation. These loose-laid structures were balanced to provide lay-flat in-service characteristics.

SUMMARY OF THE INVENTION

In one embodiment, the invention provides a resilient floor covering comprising a reinforcing layer having regions of differential relaxed compressive/tensile stiffness, said layer being disposed within the matrix material of the surface covering product and below the neutral bending plane of the floor covering.

Another embodiment of the present reinforcing layer enables the floor covering to be elongated in both the machine direction (MD) and across machine direction (AMD). A third embodiment of the present reinforcing layer enables the amount of elongation in the floor covering prior to installation, and therefore, the amount of tension and accommodation after installation, to be increased with some increase in the AMD.

One preferred floor covering has a reinforcing layer with an expandable diagonal pattern glass mat. Due to the controlled pre-stressed tension to which the reinforcing layer is subjected, the adjacent sides of the slits pull apart when the floor covering is subjected to an external tensioning force and the slits interact to form pivot points, which cooperate such that the reinforcing layer is capable of increasing in dimension and decreasing in dimension, respectively, in a direction generally transverse to an applied tensile or compression force.

In yet another preferred embodiment a plastisol impregnated non-woven network or mat has perforations in a parallel sinusoidal pattern. preferably, the pattern is oriented approximately 45° from MD. When tension is applied to the mat in the MD, it expands transversely. As the mat expands laterally from the unstressed condition, the perforations widen.

In still another preferred embodiment, the reinforcing layer is uniformly modified in situ by the chemical modification of the reinforcing layer binder. The pre-modified reinforcing layer is strong enough to perform as a carrier during manufacture yet the floor covering including the modified reinforcing layer is capable of shrinking sufficiently to accommodate the seasonal subfloor dimensional change of a wooden subfloor.

Preferably, the composition and thickness of the plastisol layers are chosen so that the reinforcing layer is disposed within the plastisol or matrix material below the neutral bending plane of the floor covering. The positioning of the reinforcing layer below the neutral bending plane promotes roll-up growth of the floor covering during storage on a wind-up core. Since the reinforcing layer is below the neutral bending plane, the floor coverings are unbalanced and therefore, are not suitable for loose-lay applications.

Inclusion of the reinforcing layer eliminates the need for a strippable carrier and the need for a special paper carrier stripping method and apparatus of the prior art. By placing the reinforcing layer below the neutral bending plane and modifying it as described, the layer will resist compression when the floor covering is rolled. However, upon unwinding, and placing flat the reinforcing layer will readily extend due to the elongated upper or outer layer of the floor covering. During roll storage, the reinforcing layer will act to keep the outer elongated surface extended unlike prior art structures where the backing could compress and anneal the structure during long term roll storage. It should be apparent that placement of the reinforcing layer above the neutral bending plane will undesirably inhibit elongation of the outer layer in the roll form and cause the matrix material below the reinforcing layer to compress more.

Figure 1:
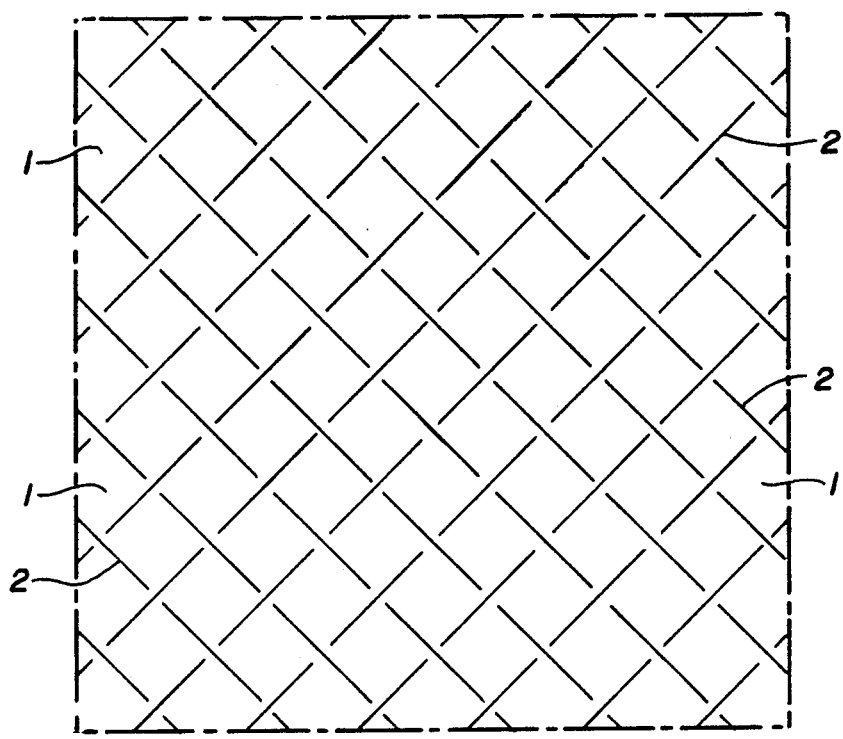
FIG. 1 is a plan view of a reinforcing layer perforated with a diagonal pattern.

An improved process for preparing tension floor coverings is provided which includes disposing a reinforcing layer in a matrix material below the neutral bending plane modifying the reinforcing layer. and placing the reinforcing layer under a controlled prestressed condition whereby the surface covering product elongates and tends to return to its preelongated dimension.

DETAILED DESCRIPTION OF THE INVENTION

An important concept for understanding one aspect of the invention is the transformation of a reinforcing layer such as a glass mat carrier for a fusable vinyl composition into an internal elastic reinforcement. As part of the manufacturing process, the glass mat or equivalent thereof may be impregnated with foamed plastisol, diagonally slit and cooled while under tension to convert it into "elastic glass". This "elastic glass" functions as if it were a network of miniature bedsprings which can absorb stretching and compressions applied to the surface covering.

Other terminology pertinent to the present invention is defined below to provide clarity in the description.

As used herein "floor covering" is a relatively thin element designed to be installed over a flooring substructure or subfloor.

As used herein, "reinforcing layer" is preferably a layer of non-woven fiber such as polyglass, polyester, or polyamide. However, the term is broad enough to include backing materials in general and specifically, backing felt.

As used in the specification and claims, the term "modified reinforcing layer" means a layer of a resilient floor covering comprising a nonvinyl composition component, the tensile strength and/or elongation of which is changed during or after manufacture of the floor covering in which the reinforcing layer is disposed. The reinforcing layer may include a vinyl resin composition including plasticizers, stabilizers and fillers but the reinforcing layer is not 100% vinyl resin composition. The cut fiber of a vinyl resin/fiber composition is considered a nonvinyl component.

As used in the specification and claims, the term "elongation due to a controlled pre-stressed condition" includes roll-up growth or elongation during the time when the floor covering is in a rolled condition, on unrolling of the floor covering and before installation. The term also includes growth or elongation which results from the application of a tensile stretching force prior to unrolling of the floor covering before installation.

As used herein, "accommodation" is a built-in property for a floor covering to alter its size and shape to match an unstable subfloor or resist surface stress.

As used herein, "tension flooring" is a floor covering installed by anchoring at the periphery only such as by adhesive or staples which tends to shrink and return to its pre-elongated length thereby remaining taut and flat throughout a fluctuating environment.

As used herein, "loose-lay flooring" or "lay-flat flooring" is a surface covering which will lie flat on a stable subfloor, which will resist doming, curling, buckling, or movement under a rolling load, and which need not be held in place using adhesives or fasteners. All acceptably performing prior art loose-lay flooring have been balanced.

As used herein, "balanced" refers to a surface covering in which the reinforcing layer is at the approximate neutral bending plane and "unbalanced" refers to a surface covering in which the reinforcing layer is not at the approximately neutral bending plane and is preferably below the neutral bending plane.

As used herein, "critical buckle strain" is the strain at which a loose-lay floor that is compressed in a planar fashion will buckle.

As used herein, "subfloor dimensional change" is a measure of the maximum change in length of a sub-floor or other subsurface material under the conditions of its environment. This change is expressed herein in change per unit length. American plywood Association approved plywood has a subfloor dimensional change of about 0.13%. National Particleboard Association particleboard has a subfloor dimensional change of about 0.25%.

As used herein, "relaxed compressive stiffness" is the approximate compressing force per inch of width divided by the induced strain, the value of the relaxed compressive stiffness being projected to a 6-week or 1000-hour load relaxation and the compressive force being applied in a planar fashion, the measurement being taken in the linear portion of the stressstrain curve.

As used herein, "relaxed tensile stiffness" is the approximate stretching force per inch of width divided by the induced strain, the value of the relaxed tensile stiffness being projected to a 6-week or 1000-hour load relaxation and the stretching force being applied in a planar fashion, the measurement being taken in the linear portion of the stress-strain curve.

As used herein, "matrix material" comprises all components of a surface covering material, excluding the reinforcing material.

As used herein, "structural stability" is a measure of the change in length in percent of a flooring samples which has been heated at 180° F. for six hours and reconditioned at 73.4° F. and 50% relative humidity for one hour. A higher structural stability value indicates the structure is less stable and therefore more susceptible to dimensional change.

As used herein, the "neutral bending plane" of a strip of material, the ends of which are being subjected to a downward bending force, is an imaginary plane within the material above which the material is under tension and below which it is under compression.

As used herein, "in situ" (in conjunction with one or more layers of reinforcing material) refers to a disposition of the reinforcing material in the final floor covering structure, in a partially completed floor covering structure, or in a prestructure such as a reinforcing material which has been pretreated which later becomes an integral part of the final floor covering structure.

In situ, modifications may be achieved as a matter of foresight or hindsight. Thus, a reinforcing material having a high or a low relaxed compressive stiffness value may be pretreated in such fashion that the relaxed compressive stiffness is increased or reduced to a satisfactory value, after Which it may be disposed within the matrix material. In view of the teachings herein, artisans may produce, or arrange to have suppliers produce, reinforcing materials having appropriate tensile strength, shrinkage and uniform relaxed compressive tensile stiffness or which contain appropriate regions of differential relaxed compressive/tensile stiffness such that the layers may be utilized With no modification or minimal modification to provide flooring structures having desired performance characteristics.

Unstable subfloors such as particleboard dramatically increase the requirements for a floor covering because such subfloors tend to expand and contract depending on the temperature and relative humidity conditions within the structure in which the subfloor resides. During winter months, dry furnace-heated air tends to shrink unstable subfloors, whereas during humid summer months such subfloors tend to expand. A loose-lay floor structure that is laid over such a subsurface at its maximum expanded position and is pinned, attached or otherwise restricted by heavy objects such as appliances experiences a variety of stresses when the subfloor changes its dimensions. A loose-lay flooring structure constructed according to the prior art and having the required structural stability is often unable to accommodate these stresses, thus leading to doming, buckling or curling of the flooring.

A wide variety of natural and synthetic reinforcing materials may be used to practice the present invention. Many composite reinforcing materials are commercially available and can be used in the construction of a variety of surface coverings. Typically, these materials are non-woven glass layers which comprise a substantially uniformly applied binder in order to provide structural integrity. Because these mats are non-woven, they usually have a substantially uniform strength in all directions. The weights of glass materials ordinarily vary from about 10 to about 150 grams per square meter, although lighter or heavier materials may be encountered on occasion. Materials such as polyester, polyamide and other natural or synthetic fibrous materials may be used alone or in combination with glass or each other to provide reinforcing materials.

Because the process of the invention preferably uses the non-woven mat as a carrier for oven fused compositions, the mat must have sufficient hot tensile strength to survive oven heating. It is preferred to employ a mat with a hot tensile strength greater than 1 pound per inch of width (ppiw) as measured on an Instron ® testing apparatus, preferably, greater than 2 ppiw and most preferably, greater than 4 ppiw. For instance, a non-woven glass fiber mat with a weight of 1.54 oz/sq. yd. can provide a tensile strength of 10 ppiw at 350° F. To avoid pattern matching problems, the breaking strength at 350° F. should be less than 10% elongation and preferably less than 5% elongation.

The primary object of the present invention is to provide a tension floor covering having a reinforcing layer. Another object is to provide a reinforcing layer which is modified in situ to permit its use as a carrier during manufacture and to impart characteristics to the floor covering product which enables its use as a tension floor. Such a reinforcing layer may be uniformly modified or have regions of differential relaxed compressive/tensile stiffness. In situ modification may be accomplished by chemically or physically changing the relaxed compressive/tensile stiffness such as by weakening or strengthening the material by printing a chemical composition on the reinforcing layer, or interrupting the material by cutting. A controlled pre-stressed tension may be introduced into the reinforcing material during manufacture or during rollup so that the reinforcing layer and floor covering expand in at least one direction.

In a preferred embodiment, the reinforcing layer expands in both the machine direction and the across machine direction. By providing a reinforcing material with a pattern of weakening or interruption whereby a plurality of pivot points are formed, the width of the material will tend to expand in a direction transverse to an applied tensile force, as well as in the direction of the tensile force. That is, flooring reinforced with "elastic glass" is capable of increasing in dimension in both the machine direction (MD) and the across machine direction (AMD).

In spite of all that had been previously developed for tension flooring and what was known of reinforcing layers, problems and limitations still existed for which no apparent solutions had been devised. Prior art tension flooring could be elongated in only one direction, typically MD. When the MD of the prior art tension flooring was elongated, the AMD would shrink or neck-in. The "elastic glass" of the present invention, such as shown in FIGS. 1 to 6, expand in both MD and AMD.

As a means of advancing the state of the art, it has been discovered that reinforcing layers and particularly non-woven mats can be plastisol encapsulated and used as a carrier during the manufacturing of improved tension flooring and becomes an integral part of the tension flooring. The present invention permits the elimination of the releaseable backing and stripping apparatus of the prior art. Also, the tendency for rolling load tear propagation is reduced.

DETAILED DESCRIPTION OF THE DRAWINGS

Figure 2:
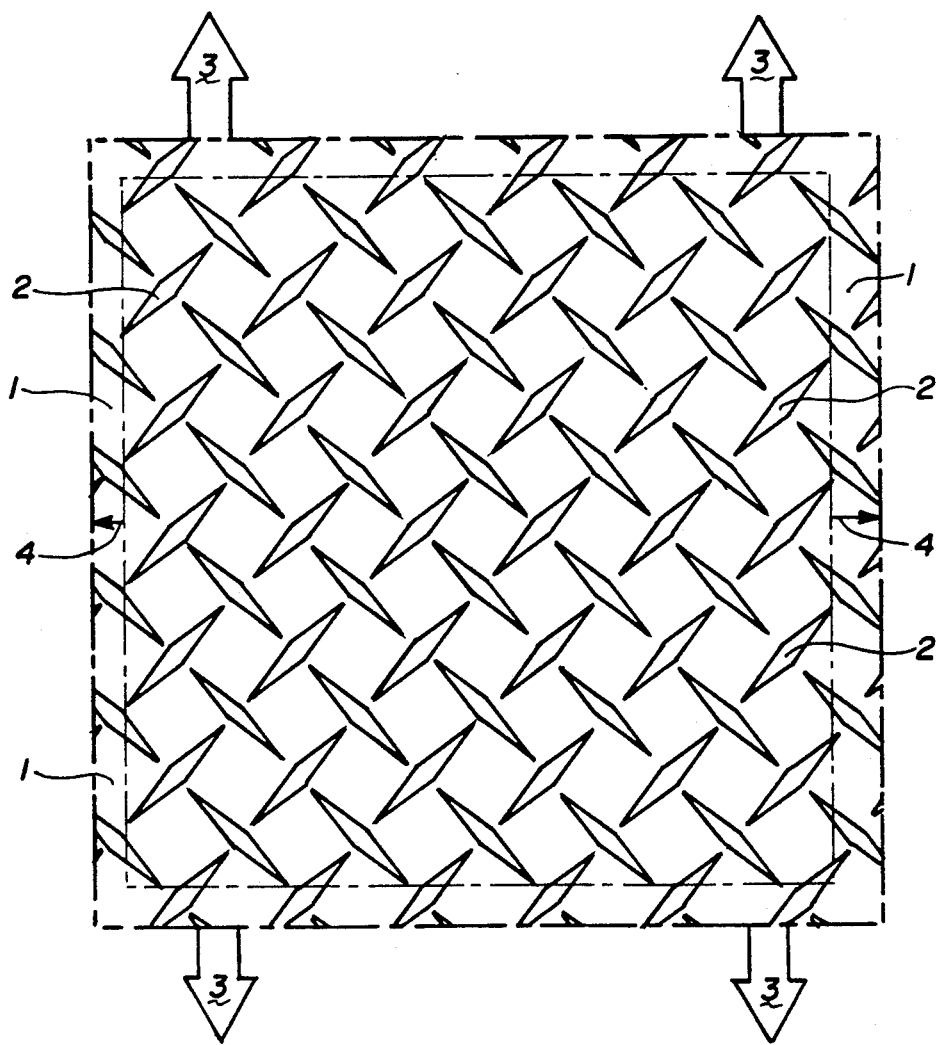
FIG. 2 is a plan view of the reinforcing layer of FIG. 1 expanded in two directions when stretched in one direction.

FIG. 1 shows a plastisol impregnated nonwoven network or mat 1 which has perforations 2 in a diagonal pattern. As seen in FIG. 2, When tension 3 is applied to the mat 1 in the MD, it expands transversely as showed at 4 in the AMD. As the mat in FIG. 2 expands laterally from the unstressed condition of FIG. 1, the perforations 2 are widened.

One embodiment of the flooring structure of the present invention has a reinforcing layer having regions of differential relaxed compressive/tensile stiffness such as shown in FIGS. 1 and 2. The regions are formed by a pattern of line segment physical disruptions in the layer. The pattern is a plurality of parallel and linearly spaced first line segments and a plurality of parallel and linearly spaced second line segments. The first and second line segments are nonintersecting and preferably substantially perpendicular to one another. They interact so as to form pivot points which cooperate so that the layer is capable of increasing in dimension or decreasing in dimension, respectively, in a direction generally transverse to an applied tensile or comprehensive force. Although substantially square areas are illustrated in the figures, it is not necessary that square areas be employed. For example, suitable reinforcing materials with regions of differential relaxed compressive/tensile stiffness may be prepared having other geometric patterns, the sole requirement being that the structures be provided with pivot points such that the width of the layer will expand in a direction substantially transverse to an applied tensile force.

The type and orientation of the pattern may depend on the manner in which is it produced. If a flat-bed press is used to create the disruption pattern, orientation is not a major consideration. However, a flat-bed press is inherently slow because the web must be stopped during the compression phase, and pattern registration problems can also be encountered. For these reasons, it is preferred to use a rotary tool to provide the pattern. The web may be passed continuously through a rotary tool, thereby speeding up the process and avoiding registration difficulties. Nevertheless, pattern orientation becomes a much more important consideration when using a rotary tool.

If the pattern is oriented as illustrated in the figures, the web is always in contact with a fairly uniform pattern cross section; i.e. it continuously "sees" essentially the same pattern as the tool turns. However, if the pattern is rotated 45 degrees, the first line segment would be oriented in the machine direction whereas the second line segments would be oriented in the across machine direction. In that situation, the Web would not see a uniform pattern. Instead it would be contacted sequentially With a pattern cross section comprising the AMD pattern alternating with the MD pattern, and then with a pattern cross section comprising only the MD pattern. In a manufacturing environment where large rotary tools many feet in length are used at high rotation speed, this orientation would cause the rotary tool to develop an oscillation or "bounce". Thus, where such tools are utilized, it is preferred to orient the pattern so that the web is contacted as uniformly as possible by the rotating tool.

Figure 11:
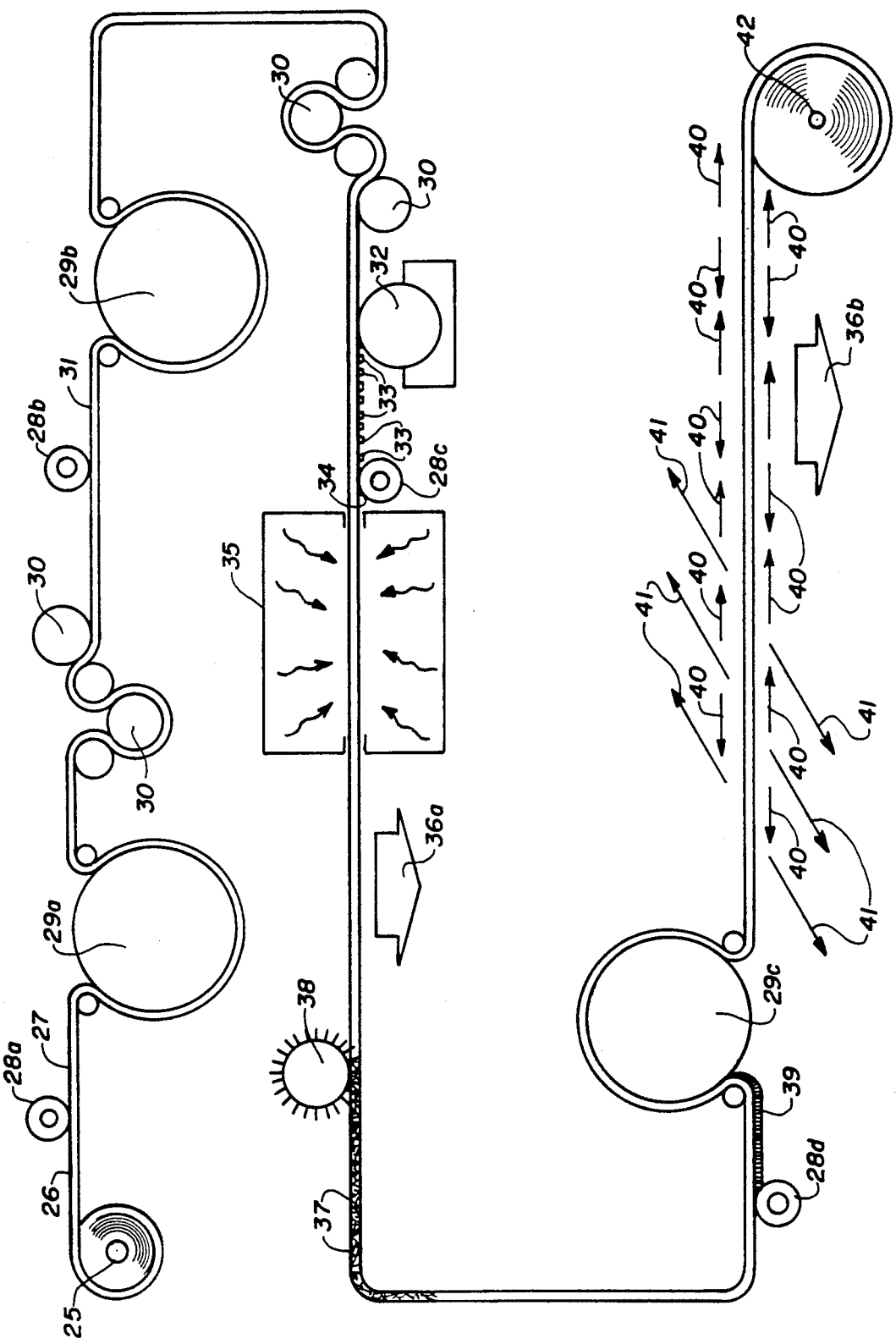
FIG. 11 is a schematic representation of the equipment for performing the manufacturing process of the present invention.

The manufacturing process for physical in situ modification is illustrated in FIG. 11. A non-woven glass mat 26 is unwound from unwind roll 25 and is impregnated with a liquid plastisol 27 under a coating roll 28a. A heating drum 29a solidifies the plasticol and the web then passed through smoothing rolls 30. A second plastisol 31 is applied by a coating roll 28b followed by heating drum 29b and smoothing rolls 30. A decorating roll 32 applies a pattern 38 followed by a clear plastisol 34 applied by coating roll 28c. The composition is heated in an oven 35 to fuse a clear vinyl layer over the decorated pattern. The composition is then cooled at 36a and the underside with the encapsulated glass mat is then perforated as shown at 37 by a perforating roll 28. The perforated mat is coated with plastisol 39 by coating roll 28d. After passing around heating drum 29c, the heated composition is subjected to a tension force 40 in the machine direction which results in an across machine direction or transverse stretching 41 and a controlled pre stressed tension. The composition is cooled at 36b while under tension and is wound on the roll 42.

The plastisol may be applied by any convenient coating technique such as dip, skim, bar, airknife, curtain. Reverse roll coating with knife thickness regulation is a preferred technique.

The foamable plastisols may vary from a 2 to 1 to a 4 to 1 blow ratio. It is preferred that the plastisol which encapsulates the mat have a 2 to 1 ratio and the plastisol coating which is decorated have a 3 to 1 ratio. The clear protective vinyl coating can range from 4 to 30 mils thickness.

Figure 3:
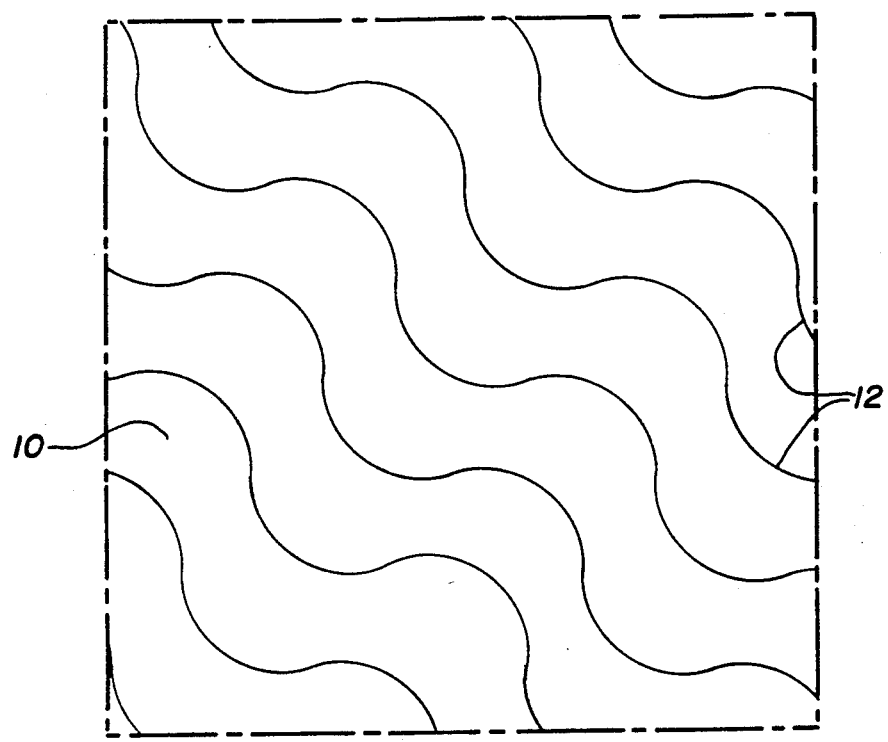
FIG. 3 is a plan view of a second embodiment of a reinforcing layer perforated with a sinusoidal pattern.

Another embodiment is shown in FIG. 3 in which the perforations 12 in the plastisol impregnated non-Woven mat 10 is in a sinusoidal pattern. Further, the sinusoidal perforations are parallel and linearly spaced.

Figure 4:
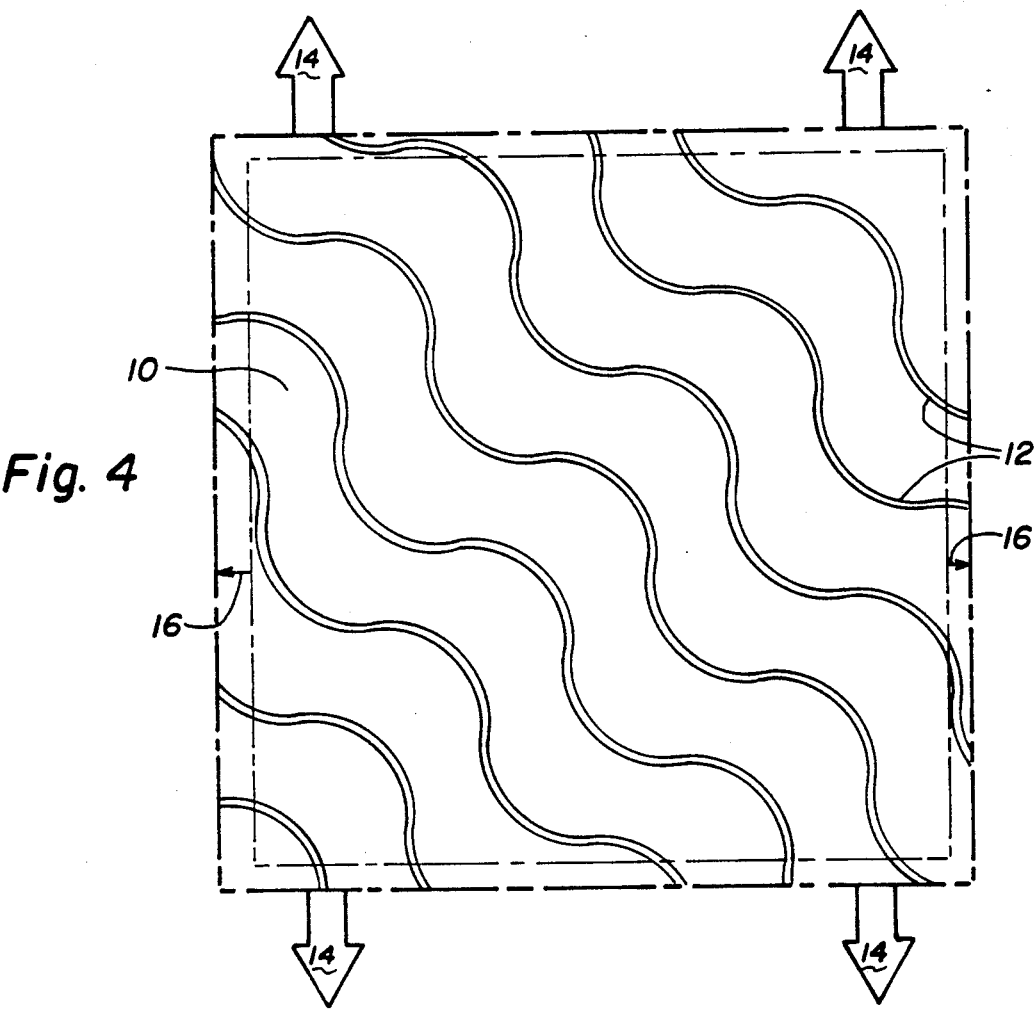
FIG. 4 is a plan view of the reinforcing layer of FIG. 3 expanded in two directions when stretched in one direction.

These perforations create regions of differential relaxed compressive/tensile stiffness in the reinforcing layer. As shown in FIG. 4, when a tensile stretching force 14 is applied to the reinforcing layer in the MD, the layer expands transversely as shown at 16 in the AMD. To obtain the greatest AMD expansion, the perforations should form an approximate 45° angle with the machine direction. Further, this facilitates manufacture in reducing the risk of pulling the reinforcing layer and floor covering apart at one of the perforations.

Figure 5:
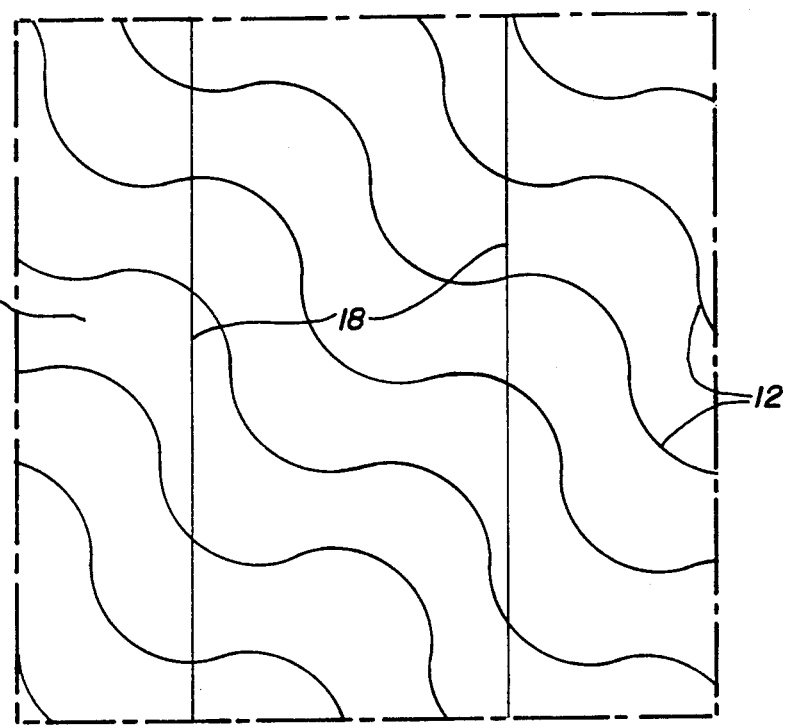
FIG. 5 is a plan view of a third embodiment similar to the FIG. 3 embodiment but with machine direction perforations.

A further variation is shown in FIG. 5 which is similar to the FIG. 3 embodiment but includes additional perforations 18 which are in the MD. As seen by comparing FIGS. 4 and 6, the MD perforations reduce the amount of AMD expansion when the tensile stretching force 14' is applied. However, the MD perforations permit greater AMD compression.

Figure 6:
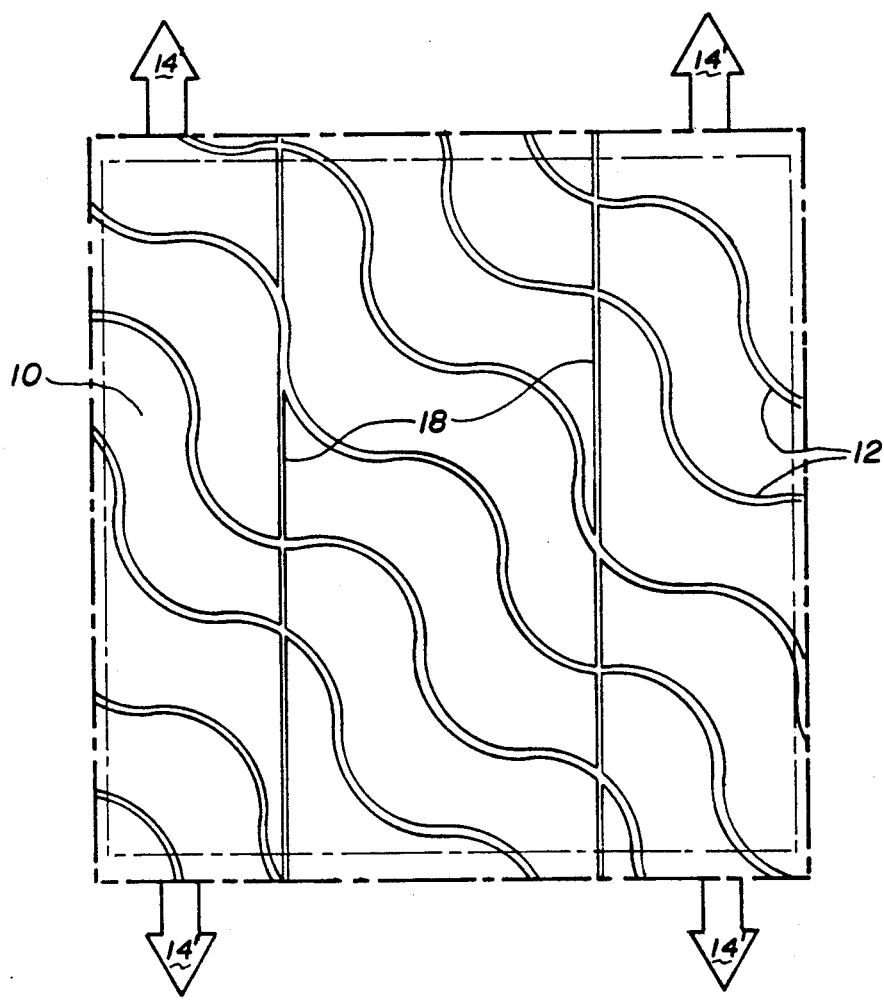
FIG. 6 is a plan view of the reinforcing layer of FIG. 5 being stretched in the machine direction and showing some expansion in the across machine direction.

When the floor covering including the reinforcing layer of FIGS. 5 and 6 is installed on a wooden subfloor while under a controlled pre-stressed condition, the floor covering will tend to shrink particularly in the MD. However, such MD shrinkage will be restrained and therefore, the floor covering will tend to shrink in any direction in which it is capable of shrinking. Since the MD perforations permit AMD shrinkage, the performance of the floor covering is improved.

The controlled pre-stressed condition of the floor covering which causes the floor covering to elongate in at least one direction can be created by applying a tensile stretching force during manufacture or rolling-up of the floor covering product or due to roll-up growth during storage of the rolled floor covering. As discussed previously in connection with FIG. 11, the pre-stressed condition can be formed by stretching the floor covering in the machine direction while the matrix is at an elevated temperature and cooling the matrix while the tensile stretching force is maintained.

Introduction of the controlled pre-stressed condition by roll-up growth is explained with reference to FIGS. 7-9. The surface covering 50 in FIG. 7 includes a perforated reinforcing layer 52 which is encapsulated in a foamed plastisol 54. A wear layer 56 is shown applied to the upper surface of the foamed plastisol 54.

To produce the greatest amount of roll-up growth, the reinforcing layer is disposed below the neutral bending plane. Preferably, the reinforcing layer is a backing layer which has only sufficient plastisol below it to encapsulate and protect the non-woven fibers. As shown schematically in FIG. 8, when the floor covering is rolled around a hard wind-up core 58, the matrix material above the reinforcing layer tends to expand. The matrix material below the reinforcing layer tends to compress. However, the portions of the reinforcing layer on either side of the perforations prohibit further contraction of the reinforcing layer and the matrix material below the reinforcing layer. Therefore, when the floor covering is unrolled as shown in FIG. 9, the expansion of the matrix material above the reinforcing layer overcomes the slight contraction of the matrix material below the reinforcing layer causing the floor covering to elongate. Note the spacing between the reinforcing segments 60 is greater in FIG. 9 than in FIG. 7.

Whether the floor covering is elongated by a tensile stretching force or roll-up growth, upon unrolling, the floor covering will begin to shrink to its original dimension. However, such shrinkage is initially relatively slow allowing ample time for the floor covering to be installed by anchoring at the periphery only.

Figure 7:
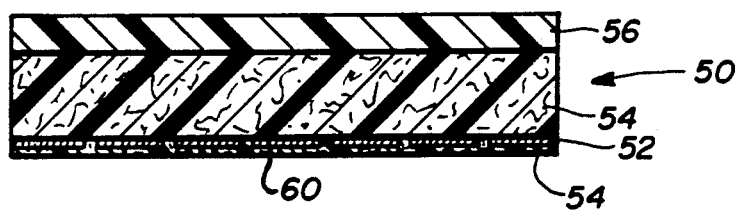
FIG. 7 is a cross-sectional view of the floor covering of the present invention.
Figure 8:
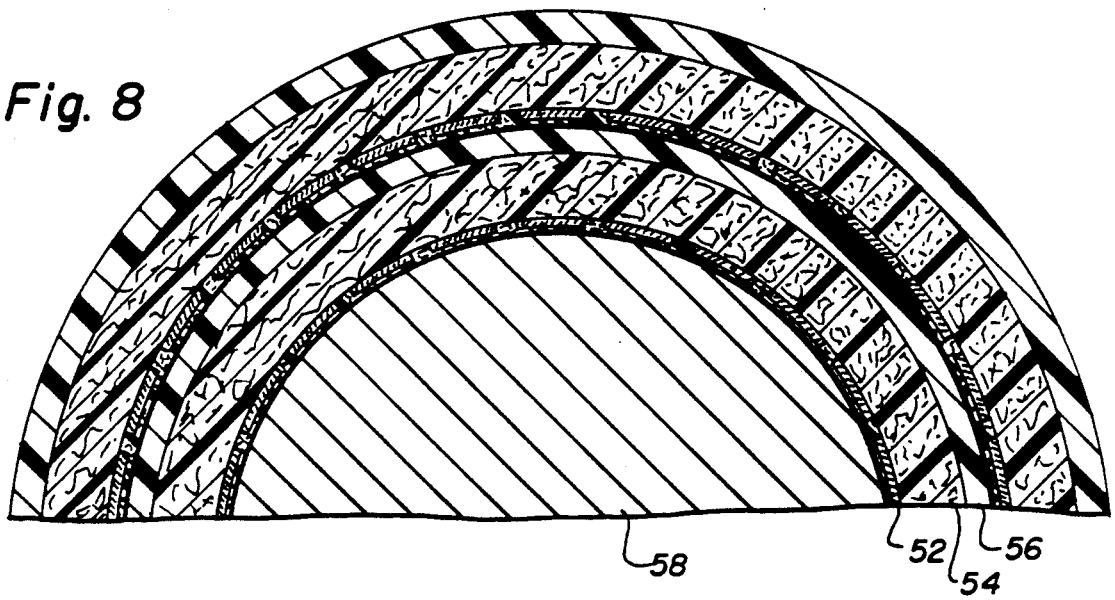
FIG. 8 is a cross-sectional view of the floor covering of FIG. 7 wound on a wind-up core.
Figure 9:
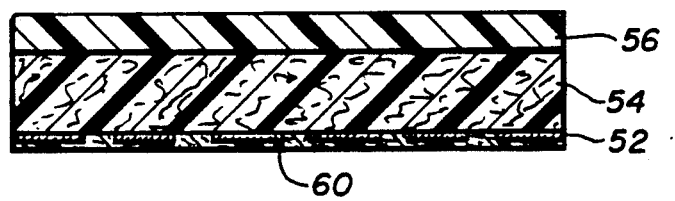
FIG. 9 is a cross-sectional view of the floor covering of FIG. 8 after being unrolled from the core and showing the elongation of the floor covering.
Figure 10:
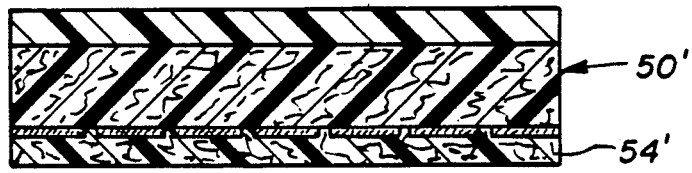
FIG. 10 is a cross-sectional view of another surface covering of the present invention.

To obtain maximum expansion, it is preferred that the reinforcing layer be a backing layer as shown in FIGS. 7-9. However, as shown in FIG. 10, the reinforcing layer 54' can be disposed within the floor covering 50'. Preferably, the reinforcing layer is below the neutral bending plane.

Prior to the present invention, no tension flooring was known which included a reinforcing layer. This is due to the fact that reinforcing layers are used in floor coverings to impart dimensional stability whereas tension flooring must be elongated and have a tendency to return to its original pre-elongated dimension.

Therefore, the floor coverings of the prior art which included reinforcing layers were installed as loose-lay coverings or fully adhered coverings. The suggestion was made with one prior art reinforced floor covering to install the floor coverings around the perimeter only. However, this installation method was specifically limited to concrete subfloors. Since the concrete subfloors are dimensionally stable, the dimensional stability of the reinforced surface coverings would not create a problem even if adhered around the perimeter only.

The reinforced floor coverings of the present invention are specifically designed to permit elongation due to a controlled pre-stressed condition whereby the floor covering tends to return to its original preelongated dimension. Such floor coverings may be used over dimensionally unstable suspended wood subfloors as well as dimensionally stable concrete subfloors.

The previously described preferred embodiments include a reinforcing layer which has been mechanically modified. It is well known in the art that highly solvating plasticizers can soften or dissolve the binders of floor covering reinforcing layers.

One skilled in the art can develop floor coverings having reinforcing layers with regions of differential relaxed compressive/tensile stiffness by chemical modification. Specifically, highly solvating plasticizers can be applied to the reinforcing layer of a floor covering in a pattern similar to the above-described perforations.

Further, since the tensile strength of the reinforcing layer must be great enough during manufacture to permit it to be used as a carrier and yet, be low enough after the floor covering matrix has been applied and cured to permit the floor covering to be elongated in at least one direction due to a controlled pre-stressed condition whereby the surface covering tends to return to its original pre-elongated dimension, the reinforcing layer can be uniformly modified by the use of a highly solvating plasticizer which will reduce the tensile strength of the reinforcing layer after it no longer needs to act as a carrier. One skilled in the art can use the teaching of the two above-identified patents to select proper combinations of reinforcing layer binder and highly solvating plasticizer.

EXAMPLE 1

A tension floor covering containing an insitu modified encapsulated glass mat was constructed for use over a particleboard subfloor having a maximum subfloor dimensional change of 0.23%.

A non-woven glass fiber mat, FG 7135 from Manville Corporation, having the following properties was used as a carrier to prepare the structure.

MAT TESTS:
Basis Weight = 32 grams per sq. yd. (measured)
Thickness (mechanical gauge) = 0.0115"
Tensile Strength at Break (350° F.) = greater than 6 ppiw The glass mat was disposed at the base of a 30 mil thick layer of foamable plastisol "A" shown below thus creating an unbalanced structure with the mat below the neutral bending plane. This was accomplished by utilizing the glass mat as a carrier, passing the glass mat through a reverse roll coater and applying 10 mils of foamable plastisol onto and into the non-woven mat. After exiting the reverse roll coater, the wet sheet was passed around a hot oil drum, which drum had been preheated to a temperature of 280° F. Sufficient contact with the drum was supplied to gel or solidify the wet coating. A second line pass through the coater was made to apply 20 mils of the same coating to the drum solidified smooth surface of the first pass. This second coating was also passed around the drum to solidify or gel the plastisol. The resulting gelled sheet was 30 mils thick with the glass mat disposed at the bottom, and having a smooth upper drum finished surface suitable for rotogravure printing.

A decorative image was rotogravure printed onto the upper smooth surface of the structure utilizing solvent inks and traditional methods well known in the art.

A protective clear plastisol "B" was applied 10 mils thick to a decorated foamable plastisol surface, the plastisol being applied by a reverse roll coater. The wet coated sheet was then passed through an oven at 400° F. to fuse the wear surface and expand the 30 mil foamable layer to 75 mils. The structure with a 10 mil clear fused vinyl top surface over the 75 mil foam layer with glass mat encapsulated at the backing within the foam layer was turned upside down and the reinforcing layer modified in-situ. A series of parallel knife cuts were made across the width of the sheet. The cuts were spaced ⅜" from each other in a sinuous pattern (sine wave instead of straight line) forming parallel physical separations within the reinforcing layer which were angled 45° to the machine direction.

The structure with the reinforcement modified was passed through a reverse roll coater which applied 6 mils of plastisol coating "C" to the modified backing. The wet coating was fused by passing around a heated drum (280° F. drum temperature) contacting the drum for 25 seconds.

The plastisols shown below were prepared for construction of Examples I, II, and III.

(The specific viscosities of the resins according to ASTM D-1243 are shown in parenthesis.)

| | Parts By Weight |
|---|---|
| FOAMABLE PLASTISOL "A" | |
| PVC homopolymer resin, dispersion grade (0.38) | 66 |
| PVC homopolymer resin, extender grade (0.35) | 34 |
| Monomeric Plasticizer | 55 |
| Limestone filler | 35 |
| Azobisdicarbonamide, blowing agent | 1.2 |
| Blowing agent activator | 0.6 |
| Stabilizer | 0.7 |

| | Parts By Weight |
|---|---|
| PLASTISOL "B" | |
| Clear Surface Coating | |
| PVC homopolymer resin, dispersion grade (0.60) | 30 |
| PVC homopolymer resin, dispersion grade (0.42) | 70 |
| Monomeric Plasticizer | 45 |
| Viscosity Diluent | 5 |
| Stabilizer | 1 |
| PLASTISOL "C" | |
| PVC homopolymer resin, dispersion grade (0.38) | 59.7 |
| PVC homopolymer resin, blending grade (0.35) | 40.3 |
| Monomeric Plasticizer | 37.7 |
| Stabilizer | 2.7 |
| FOAMABLE PLASTISOL "D" | |
| PVC homopolymer resin, dispersion grade (0.88) | 66 |
| PVC homopolymer resin, extender grade (0.35) | 34 |
| Monomeric Plasticizer | 62 |
| Limestone filler | 50 |
| Azobisdicarbonamide, blowing agent | 0.8 |
| Blowing agent activator | 0.6 |
| Stabilizer | 0.7 |
| FOAMABLE PLASTISOL "E" | |
| PVC homopolymer resin, dispersion grade (0.38) | 66 |
| PVC homopolymer resin, extender grade (0.35) | 34 |
| Monomeric Plasticizer | 62 |
| Limestone filler | 50 |
| Azobisdicarbonamide, blowing agent | 1.5 |
| Blowing agent activator | 0.6 |
| Stabilizer | 0.7 |
| PLASTISOL "F" | |
| PVC homopolymer resin, dispersion grade (0.38) | 60 |
| PVC homopolymer resin, extender grade (0.35) | 40 |
| Monomeric Plasticizer | 62 |
| Stabilizer | 1.5 |
| Pigment | 3.0 |
| Limestone Filler | 50 |

The structure was measured and marked before rolling onto a 7" diameter wind-up core. After being stored for seven days at room temperature, the structure was unrolled and placed flat upon the foot. After five minutes the floor covering was measured and found to be elongated in the MD direction.

The shrinkage after unroll was determined. The total shrinkage due to roll-up growth and dimensional stability was at least:

| | |
|---|---|
| 5 minutes | 0 initial measurement |
| 15 minutes | 0.014% shrinkage from initial |
| 60 minutes | 0.018% shrinkage from initial |
| 4 hours | 0.052% shrinkage from initial |
| 1 day | 0.063% shrinkage from initial |
| 4 days | 0.066% shrinkage from initial |
| 7 days | 0.079% shrinkage from initial |
| 6 weeks | 0.35% shrinkage from initial |

Therefore, over a period of six weeks, the shrinkage is greater than the maximum subfloor dimensional change due to seasonal factors. Further, the shrinkage is also slow in the beginning allowing ample time to install the structure by attachment at its periphery. Since the expected subfloor maximum dimensional change is 0.23%, if the floor covering structure is installed perimeter attached over the subfloor and the subfloor shrinks its maximum 0.23%, the structure will remain flat and under tension.

EXAMPLE II

A 12 mil thick. 0.90lb./100 sq. ft non-woven mat containing 80% wool glass as disclosed in U.S. Pat. No. 2,882,173 and 20% textile glass as disclosed in U.S. Pat.

No. 2,334,961 and a binder content of 21.9% left on ignition of 60% styrene butadiene rubber (Dow Latex 485) and 40% methylated melamine formaldehyde (Cymel 327 sold by American Cyanamid) was selected for preparation of a tension floor for use over a plywood subfloor having a maximum subfloor dimensional change of 0.13%. To demonstrate the effect of plasticizer in reducing the tensile strength of the mat, the mat was treated with butylbenzyl phthalate plasticizer at 350° F. for one minute, allowed to cool to room temperature, and the tensile properties of the treated mat was determined.

| Tensile/Breaking Strength | @ 73.4° F. | @ 350° F. |
|---|---|---|
| Initial Non-woven Mat | 9.38 ppiw | 8.88 ppiw |
| Plasticizer Modified Mat | 3.58 PPIW | 3.78 PPIW |

The selected mat was passed through a reverse roll coater which applied 10 mils of foamable plastisol "A" above onto and into the non-woven mat. The wet saturated mat was then passed around a hot oil drum (280° F. drum temperature) allowing sufficient contract to gel or solidify the coating. The structure was cooled around cooling cans and then fed to a windup stand. In a separate line pass through the same equipment the reverse roll coater applied 15 mils of the same plastisol to the drum finished surface from pass one. This second coating was then gelled by passing around the drum at the same temperature with sufficient contact to gel or solidify the plastisol. Again the structure was cooled and then fed to a windup stand. The structure was completed by applying 10 mils of clear surface coating plastisol "B" above to the drum finished foamable plastisol surface. The structure was then passed through an oven to expand the foamable plastisol and fuse the structure. The clear plastisol was applied by reverse roll 10 mils thick and then fed into an oven at an oven temperature of 400° F. to produce a 64 mil thick structure having a 10 mil clear plastisol surface and a 54 mil thick foam backing with the glass mat disposed at the base of the foam.

The structure was measured and marked before rolling onto a 7 inch diameter wind-up core. After being stored for 7 days at room temperature, the structure was unrolled and placed flat upon the floor. After 5 minutes the floor structure was measured and found to be elongated in the machine direction.

The shrinkage after unroll was determined. The total shrinkage due to roll-up growth and dimensional stability was at least:

| 5 minutes | 0.0 initial measurement |
|---|---|
| 15 minutes | 0.013% shrinkage from initial |
| 60 minutes | 0.021% shrinkage from initial |
| 4 hours | 0.056% shrinkage from initial |
| 1 day | 0.066% shrinkage from initial |
| 3 days | 0.076% shrinkage from initial |
| 7 days | 0.082% shrinkage from initial |
| 6 weeks | 0.26% shrinkage from initial |

Therefore, this floor covering structure is capable of shrinking greater than the 0.13% maximum subfloor dimensional change of the plywood subfloor. If the structure is installed perimeter attached to the subfloor and the subfloor shrinks its maximum dimensional change of 0.13% the structure will remain flat and under tension.

EXAMPLE III

A tension floor covering was prepared using a roll of #FG7155 non-woven glass mat commercially available from Manville Corporation. The mat tensile strength at 850° F. was measured producing an average value of 12 PPIW, making it suitable for use as a carrier. The roll of glass mat was fed through machinery from an unwind stand and used to construct the following tension floor structure:

The glass mat was passed through a reverse roll coater where plastisol "D" above was deposited onto and into the mat surface at a deposition rate of 420 grams of plastisol per square yard. The wet coated sheet was passed around a hot oil heated drum at a drum temperature of 285° F. The gelled sheet exiting the drum was passed around cooling cans. A 21 mil thick sheet resulted with a smooth upper drum finished surface.

A layer of plastisol "E" 0.006 inches thick was applied by reverse roll coater to the drum finished surface, and the coated mat Was passed around a heat drum (285° F. drum temperature) to gel the wet coating. The sheet temperature was reduced by passing around cooling cans.

The sheet was passed through a rotogravure printer to deposit a decorative image on the surface of plastisol "E".

After the decorative printing step, a clear layer of plastisol "B" was applied over the decorated surface to provide a protective layer 0.01 inches thick. The coated structure was passed through a fusion oven heated to 380° F. to (1) fuse the wet coating, (2) expand the foamable plastisol "E" to about 3times its applied thickness and (3) expand the 21 mil thick layer with glass mat to 30 mils.

After cooling, the pattern of FIG. 1 was embossed into the foam backing with sufficient pressure supplied to a rotary tool to perforate the reinforcing layer causing physical separations. A layer of plastisol "F" was applied to the modified backing 0.006 inches thick. The wet coating was fused by passing around a 310° F. heated drum for a contact dwell of 20 to 25 seconds. The hot sheet exiting the drum was elongated by applying tension in the machine direction causing expansion also transverse or across machine direction. The elongated structure was cooled below 100° F. by passing around cooling cans. The structure was placed into a roll at a wind-up stand while expanded. After one week at room temperature, the material was unwound from the roll and the shrinkage after unroll for the machine direction was determined. The total shrinkage due to roll-up growth and dimensional stability was at least:

| 5 minutes | 0.0 initial measurement |
|---|---|
| 7 days | 0.082% shrinkage from initial |
| 6 weeks | 0.026% shrinkage from initial |

Two additional samples were measured increasing line tension in the machine direction of the above heated structure exiting the hot oil drum on the final step of the process.

6 Week Shrinkage

Example III above=0.26%
Example III with increased line tension=0.37%

Example III With additional increased line tension = 0.46%

Therefore, as the line tension is increased, the total shrinkage due to roll-up growth and dimensional stability increases.

Example IV

Figure 12:
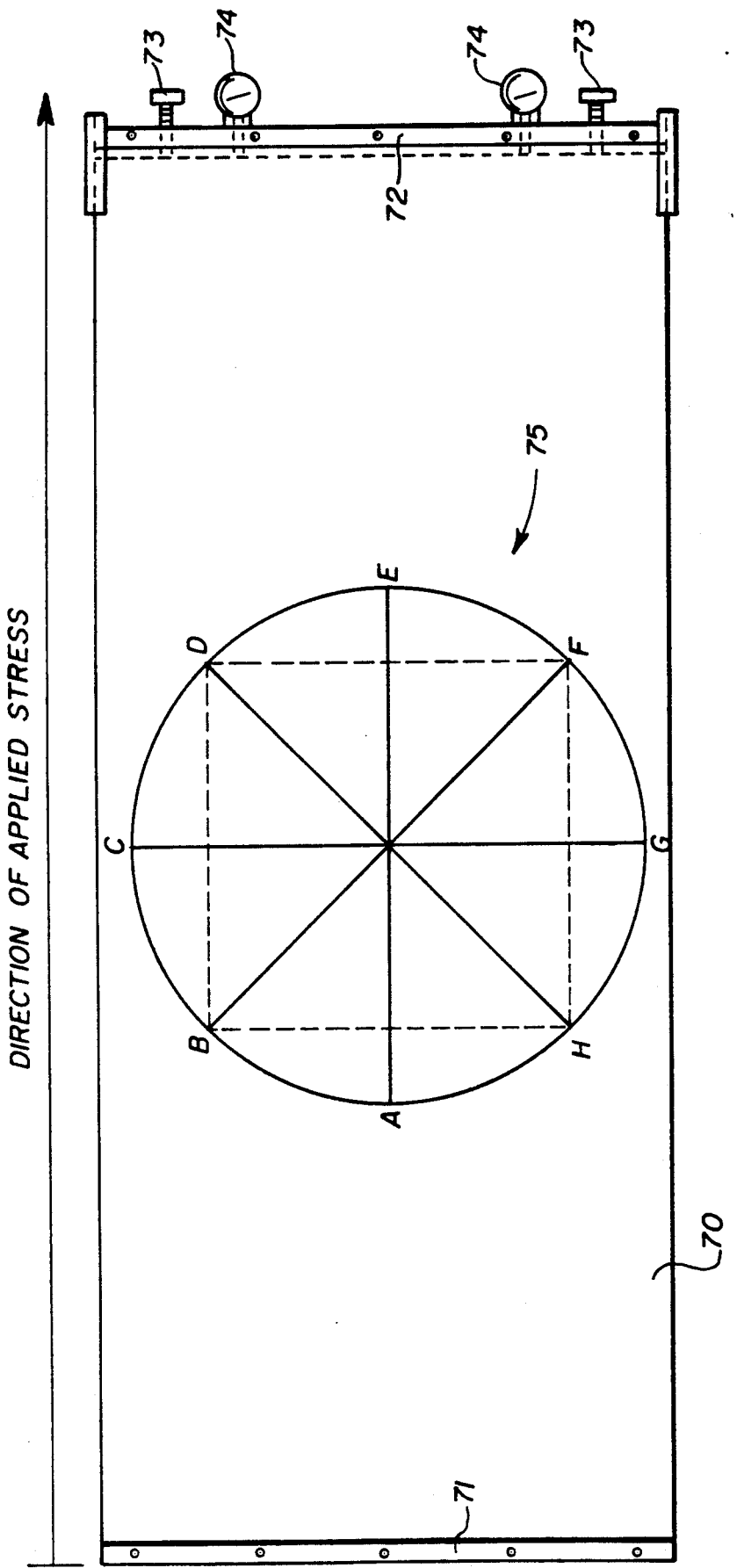
FIG. 12 is a plan view of apparatus used to test the flooring structure of the present invention.

A series of tests was run on various non-prestessed reinforcing layers and flooring structures using a test apparatus as illustrated in FIG. 12. In this figure, 70 is the bed on which the sample rests, 71 is a stationary clamping rail and 72 is a moveable clamping rail. To conduct the test, a sample was cut having approximately the width of the bed (about 19 inches) and having a length sufficient for the ends of the sample to be clamped by rails 71 and 72 (about 50 inches). In the examples which follow, samples were cut such that the long dimension (the direction of applied stress) was in the machine direction whereas the narrow dimension was in the across machine direction. A tensile stretching force was then applied by tightening turn screws 78 such that gauges 74 indicated that the sample had been elongated by about 0.4 inch. Sample I was an exception, however, since the mat was uncut, the sample was only elongated about 0.15 inch.

The test results were obtained through measurements made using benchmark diagram 75. In this diagram, line A-E coincides with the direction of the applied stretching force, lines B-F and D-H are at a 45-degree angle to the applied force, and line C-G is transverse to the applied force. Measurements were made by placing the sample on the bed in a clamped, but stress-free posture, transcribing diagram 75 onto the sample, measuring distances A E, B F, C-G and D-H of the circle and B-D, D-F, F-H and H-B of the square, applying stress to the sample by elongating it as described above, and determining the relative changes in length of each dimension. For conventional samples, distances B-H, 0-G and D-F would be expected to diminish whereas samples prepared using the pattern of FIG. 1 were found to increase. These results may be seen from the following tables in which Samples I-V are identified as follows:

| Sample | Description |
| --- | --- |
| I | Manville FG7155 glass mat, uncut, basis weight 55 g/m² |
| II | Manville FG7155 glass mat, cut in the pattern illustrated in FIG. 1. |
| III | Floor covering described below (non-pre-stressed but without a back coat) |
| IV | Floor covering described below (non-pre-stressed but with uncut mat and without a back coat) |

A non-woven glass mat FG7155 available from Manville Corporation was utilized as a carrier to prepare the structure. The mat had a hot tensile strength in excess of five pounds per inch of width when tested at 350° F.

The mat was passed through a reverse roll coater where foamable plastisol "D" above was applied into the upper porous surface of the mat. The wet coated side of the sheet was passed around a heated drum (280° F.) to gel the plastisol. A 0.021 inch thick sheet weighing 460 grams per square yard was produced. The heated sheet was passed around cooling cans to cool the structure sufficient to apply a second coating. After cooling, the structure was passed through a reverse roll coater where a 0.006 inch thick coating of foamable plastisol "E" above was applied to the smooth drum finished surface of the sheet. This second wet coating was gelled by passing around a heated drum with a 280° F. drum temperature. The heated sheet exiting the drum was passed around cooling cans to cool the structure sufficient to apply a rotogravure decorative print.

The smooth drum finished surface was then printed by conventional rotogravure printing utilizing solvent inks. Benzotriazole inhibitor was added to one of the inks to produce embossing by traditional chemical means of blowing agent inhibition. The decorated sheet was fed through a reverse roll coater where a clear protective coating of plastisol "B" above was applied over the decorated sheet surface to produce a 0.010 inch thick clear layer on the surface. The structure was passed through an oven at about 380° F. to fuse the 0.010 inch thick wear layer, expand the upper foamable plastisol layer to 0.015 inches in areas not printed with inhibitor, and expand the bottom foam and glass layer to 0.028 inches of thickness.

The structure was cooled to a temperature below 100° F. and fed through a set of pinch rolls where the upper roll was an embossing roll and the backing roll was a smooth steel roll. The structure was fed upside down through the pinch nip such that the decorative clear coated surface was against the smooth steel roll and the glass mat and foam surface was against the embossing roll. Sufficient pressure was supplied to the pinch nip to emboss into and perforate the glass mat producing the pattern shown in FIG. 1.

The modified structure was passed through a reverse roll coater to apply 0.012 inches of plastisol "F" to the back foam side of the structure. The wet coating was fused by passing around a heated drum, 310° F. drum temperature, for about 20 to 25 seconds.

The following tables indicate the values which were obtained under ambient conditions before and after elongation. The right-hand columns of the tables indicate the changes which were observed. It is noted that only samples II, III, and IV in which the mats were cut showed increases in width for the C-G measurements and for the D-F and H-B measurements.

TABLE I

| | Measurements Using the Circular Portions of the Diagram ||||||||||||
| | Initial Measurements (Inches) |||| Measurements After Elongation (Inches) |||| Change (Inches) ||||
| SAMPLE | AE | BF | CG | HD | AE | BF | CG | HD | AE | BF | CG | HG |
| --- | --- | --- | --- | --- | --- | --- | --- | --- | --- | --- | --- | --- |
| I | 18.49 | 18.49 | 18.48 | 18.47 | 18.55 | 18.50 | 18.44 | 18.50 | +0.06 | +0.01 | −0.04 | +0.03 |
| II | 14.97 | 14.93 | 14.95 | 14.95 | 15.12 | 15.05 | 15.09 | 15.11 | +0.15 | +0.12 | +0.14 | +0.16 |
| III | 17.98 | 17.98 | 18.01 | 18.01 | 18.12 | 18.06 | 18.05 | 18.08 | +0.14 | +0.08 | +0.04 | +0.07 |
| IV | 17.94 | 17.94 | 17.94 | 17.94 | 18.10 | 18.01 | 17.99 | 18.02 | +0.16 | +0.07 | +0.05 | +0.06 |
| V | 17.03 | 17.01 | 17.00 | 17.02 | 17.15 | 17.06 | 16.95 | 17.06 | +0.12 | +0.05 | −0.05 | +0.04 |

TABLE II

| | Measurements Using the Square Portions of the Diagram | | | | | | | | | | | |
|---|---|---|---|---|---|---|---|---|---|---|---|---|
| | Initial Measurements (Inches) | | | | Measurements After Elongation (Inches) | | | | Change (Inches) | | | |
| SAMPLE | AE | DF | FH | HB | AE | DF | FH | HB | BD | DF | FH | HB |
| I | 13.05 | 13.05 | 13.03 | 13.10 | 13.09 | 13.02 | 13.05 | 13.06 | +0.04 | −0.03 | +0.02 | −0.04 |
| II | 10.52 | 10.52 | 10.60 | 10.55 | 10.66 | 10.62 | 10.70 | 10.62 | +0.14 | +0.10 | +0.10 | +0.07 |
| III | 12.77 | 12.69 | 12.72 | 12.71 | 12.87 | 12.73 | 12.82 | 12.74 | +0.01 | +0.04 | +0.01 | +0.03 |
| IV | 12.63 | 12.70 | 12.66 | 12.68 | 12.76 | 12.74 | 12.77 | 12.70 | +0.13 | +0.04 | +0.11 | +0.02 |
| V | 12.74 | 12.73 | 12.76 | 12.72 | 12.83 | 12.70 | 12.85 | 12.68 | +0.09 | −0.03 | +0.09 | −0.04 |

What is claimed is:

1. A resilient, tension floor covering comprising a reinforcing layer and a matrix material wherein a continuous layer of said matrix material covers said reinforcing layer, the reinforcing layer having been modified by chemical or mechanical means to have a relaxed compressive stiffness and relaxes tensile stiffness such that the floor covering will elongate under tension, the reinforcing layer being elongated in at least one direction, the total of the elongation and shrinkage due to aging of the floor covering being greater than 0.2% as measured over a six week period at room temperature.

2. The floor covering of claim 1 wherein the elongation and shrinkage due to aging of the floor covering is greater than the subfloor dimensional change of a target wooden subfloor.

3. The floor covering of claim 1 wherein the floor covering is secured to a target subfloor around the periphery only.

4. A resilient, tension floor covering comprising a reinforcing layer and a matrix material wherein a continuous layer of said matrix material covers said reinforcing layer, the reinforcing layer having been modified by chemical or mechanical means to have a relaxed compressive stiffness and relaxed tensile stiffness such that the floor covering will elongate under tension, the reinforcing layer being elongated in at least one direction, the total of the elongation and shrinkage due to aging of the floor covering being greater than 0.2% as measured over a six week period at room temperature, the floor covering being unbalanced.

5. The floor covering of claim 1 wherein the reinforcing layer has a first region and a second region, the relaxed compressive stiffness and the relaxed tensile stiffness of the first region being different than the relaxed compressive stiffness and the relaxed tensile stiffness of the second region.

6. The floor covering of claim 1 wherein the reinforcing layer is elongated at least in part by an applied tensile stretching force which tensile stretching force is applied to the reinforcing layer after the matrix material has been fused.

7. A resilient floor covering comprising a reinforcing layer and a matrix material, the reinforcing layer having been modified by chemical or mechanical means to have a relaxed compressive stiffness and relaxed tensile stiffness such that the floor covering will elongate under tension,, the reinforcing layer being elongated in at least one direction, the total of the elongation and shrinkage due to aging of the floor covering being greater than 0.2% as measured over a six week period at room temperature, the reinforcing layer having been elongated at least in part due to roll-up growth.

8. The floor covering of claim 1 wherein the reinforcing layer is a carrier during manufacture of the floor covering.

9. A resilient, tension floor covering comprising a single reinforcing layer and a matrix material, the reinforcing layer having been modified by chemical or mechanical means to have a relaxed compressive stiffness and relaxed tensile stiffness such that the floor covering will elongate under tension, the reinforcing layer having a first region and a second region, the relaxed compressive stiffness and the relaxed tensile stiffness of the first region being different than the relaxed compressive stiffness and the relaxed tensile stiffness of the second region, said reinforcing layer being disposed within the matrix material of the floor covering and below the neutral bending plane of the floor covering, the neutral bending plane of the floor covering being between the upper and lower surface of the floor covering.

10. The floor covering of claim 9 wherein the first and second regions are formed by a pattern comprising a plurality of substantially parallel and linearly spaced first line segments.

11. The floor covering of claim 10 wherein the first line segments are sinuous.

12. The floor covering of claim 10 wherein the floor covering has a machine direction and the first line segments form an angle with the machine direction.

13. The floor covering of claim 12 wherein the first line segments form an approximate 45° angle with the machine direction.

14. The floor covering of claim 10 wherein the pattern includes a plurality of substantially parallel and linearly spaced second line segments.

15. The floor covering of claim 14 wherein the first and second line segments are substantially perpendicular to one another.

16. The floor covering of claim 14 wherein the first and second line segments do not intersect but interact to form pivot points, said pivot points cooperating such that the layer is capable of increasing in dimension in a direction generally transverse to an applied tensile force.

17. The floor covering of claim 16 wherein the reinforcing layer has a machine direction and the reinforcing layer is elongated at least in part by applying a tensile stretching force in the machine direction which tensile stretching force is applied to the reinforcing layer after the matrix material has bene fused, and the across machine dimension, perpendicular to the machine dimension, is about 0.2% to about 10% greater than the across machine dimension before the tensile stretching force was applied.

18. The floor covering of claim 9 wherein the reinforcing layer comprises a nonwoven fiber.

19. The floor covering of claim 17 wherein the fibers are selected from the group consisting of glass, polyester and polyamide.

20. The floor covering of claim 18 wherein the first and second regions are formed by chemical modification of the reinforcing layer.

21. The floor covering of claim 20 wherein the first and second regions are formed by chemical modification of the reinforcing layer binder.

22. The floor covering of claim 15 wherein the first and second regions are formed by physical modification of the fibers.

23. The floor covering of claim 22 wherein the first and second line segments are open slits.

24. The floor covering of claim 9, wherein the reinforcing layer is elongated in at least one dimension, the total of the elongation and shrinkage due to aging of the floor covering being greater than 0.2% as measured over a six week period at room temperature.

25. The floor covering of claim 24 wherein the reinforcing layer has a machine direction and the reinforcing layer is elongated at least in part by subjecting the reinforcing layer to a tensile stretching force in the machine direction during roll-up of the floor covering.

26. The floor covering of claim 24 wherein the reinforcing layer is elongated at least in part by a tensile stretching force in the direction of the one dimension which tensile stretching force is applied to the reinforcing layer after the matrix material has been fused.

27. The floor covering of claim 26 wherein the one dimension is about 0.1% to about 10% greater than the one dimension before the tensile stretching force was applied.

28. The floor covering of claim 24 wherein the reinforcing layer is elongated at least in part by growth of the matrix material above the neutral bending plane while the floor covering is in a roll which growth is not counteracted by shrinkage of the matrix material below the neutral bending plane, the neutral bending plane being between the upper and lower surfaces of the floor covering.

29. A tension floor covering comprising a single reinforcing layer and a matrix material, the reinforcing layer having been modified by chemical or mechanical means to have a relaxed compressive stiffness and relaxed tensile stiffness such that the floor covering will elongate under tension, said reinforcing layer being disposed within said matrix material, said matrix material including a first upper layer above said reinforcing layer and a second lower layer below said reinforcing layer, said matrix layers having compositions such that on rolling the floor covering with the surface of the upper layer of the matrix material opposite the reinforcing layer facing outward, the upper layer is elongated and the lower matrix layer facing inward is compressed, and on unrolling the floor covering the elongated upper layer overcomes the compressed lower layer and the floor covering has a dimension greater than its original unrolled dimension by at least 0.1%.

30. The floor covering of claim 29 wherein the reinforcing layer is disposed below the neutral bending plane of the floor covering, the neutral bending plane of the floor covering being between the upper and lower surfaces of the floor covering.

31. A resilient, tension floor covering comprising a reinforcing layer and a matrix material, the reinforcing layer having been modified by chemical or mechanical means to have a relaxed compressive stiffness and relaxed tensile stiffness such that the floor covering will elongate under tension, the matrix material forming a continuous layer said continuous layer covering said reinforcing layer, the reinforcing layer being elongated in at least one direction, the total of the elongation and shrinkage due to aging of the floor covering being greater than 0.2% in one dimension within 1,000 hours at room temperature.

32. The floor covering of claim 1 wherein the tensile strength at 350° F. of the reinforcing layer is at least 2 ppiw at the time of manufacture of the floor covering.

33. The floor covering of claim 1 wherein the reinforcing layer is substantially uniformly modified in situ by a chemical modification of the reinforcing layer binder.

34. A tension floor covering comprising a reinforcing layer and a matrix material wherein a continuous layer of said matrix material covers said reinforcing layer, the reinforcing layer having been modified by chemical or mechanical means to have a relaxed compressive stiffness and relaxed tensile stiffness such that the floor covering will elongate under tension, the floor covering being secured to a wooden subfloor around the periphery of the floor covering only, the reinforcing layer being elongated in at least one direction, the total of the elongation and shrinkage due to aging to the floor covering being greater than 0.2% as measured over a six week period at room temperature.

35. The floor covering of claim 34 wherein the reinforcing layer is physically modified in situ.

36. The floor covering of claim 34 wherein the reinforcing layer is chemically modified in situ.

37. A method for making a resilient, tension floor covering comprising:
(a) disposing a reinforcing layer in a matrix material,
(b) modifying the reinforcing layer by chemical or mechanical means to have a relaxed compressive stiffness and relaxed tensile stiffness such that the floor covering will elongate under tension, and
(c) elongating the reinforcing layer whereby the total of the elongation and shrinkage due to the aging of the floor covering is greater than 0.2% as measured over a six week period at room temperature.

38. The method of claim 31 further comprising forming first and second regions in the reinforcing layer, the relaxed compressive stiffness and the relaxed tensile stiffness of the first region being different than the relaxed compressive stiffness and the relaxed tensile stiffness of the second region.

39. The method of claim 38 wherein the reinforcing layer is elongated at least in part by subjecting the reinforcing layer to a tensile stretching force in the machine direction while the floor covering is being rolled-up.

40. The floor covering of claim 1 wherein the elongation and shrinkage due to aging of the floor covering is greater than 0.25%.

41. The floor covering of claim 40 wherein the elongation and shrinkage due to aging of the floor covering is greater than 0.35%.

42. The floor covering of claim 34 wherein the reinforcing layer is elongated at least in part due to roll-up growth.

43. The floor covering of claim 4 wherein comprising the reinforcing layer is disposed within said matrix material, said matrix material including a first upper layer above said reinforcing layer and a second lower layer below said reinforcing layer, said reinforcing layer and matrix material forming a backing layer of the floor covering.

44. The floor covering of claim 4 wherein the floor covering has a lower surface opposite an exposed upper surface, the reinforcing layer being adjacent the lower surface.

45. The floor covering of claim 44 wherein the floor covering comprises a single reinforcing layer.

* * * * *

UNITED STATES PATENT AND TRADEMARK OFFICE
CERTIFICATE OF CORRECTION

PATENT NO. : 5,082,708

DATED : January 21, 1992

INVENTOR(S) : William J. Kauffman et al.

It is certified that error appears in the above-identified patent and that said Letters Patent is hereby corrected as shown below:

Column 1, line 39, the number "2,800,428" should read --2,800,423--.
Column 1, line 48, the number "8,297,461" should read --3,297,461--.
Column 1, line 51, "(PVO)" should read --(PVC)--.
Column 7, line 65, the word "comprehensive" should read --compressive--.
Column 8, line 48, the number "38" should read --33--.
Column 8, line 53, the number "28" should read --38--.
Column 12, line 16, the number "(0.88)" should read --(0.38)--.
Column 12, line 39, the word "foot" should read --floor--.
Column 14, line 6, "850°F." should read --350°F.--.
Column 15, line 21, the number "78" should read --73--.
Column 15, line 38, "0-G" should read --C-G--.
Columns 17 and 18, line 5, "AE" should read --BD-- on two occasions.
Columns 17 and 18, line 8, the number "+0.01" should read --+0.10-- on two occasions.

Claim 1, column 17, line 19, the word "relaxes" should read --relaxed--.
Claim 17, column 18, line 59, the word "bene" should read --been--.
Claim 19, column 18, line 66, the number "17" should read --18--.
Claim 22, column 19, line 7, the number "15" should read --18--.
Claim 34, col. 20, line 20, (2nd occurrence) "to" should read --of--.

UNITED STATES PATENT AND TRADEMARK OFFICE
CERTIFICATE OF CORRECTION

PATENT NO. : 5,082,708

DATED : January 21, 1992

INVENTOR(S) : William J. Kauffman et al.

It is certified that error appears in the above-identified patent and that said Letters Patent is hereby corrected as shown below:

Claim 38, column 20, line 38, the number "31" should read --37--.

Signed and Sealed this

Twenty-seventh Day of April, 1993

*Attest:*

MICHAEL K. KIRK

*Attesting Officer*     *Acting Commissioner of Patents and Trademarks*